April 13, 1943. H. A. BERKMAN 2,316,646
VALVE LIFTER AND SPRING COMPRESSOR
Filed May 25, 1942
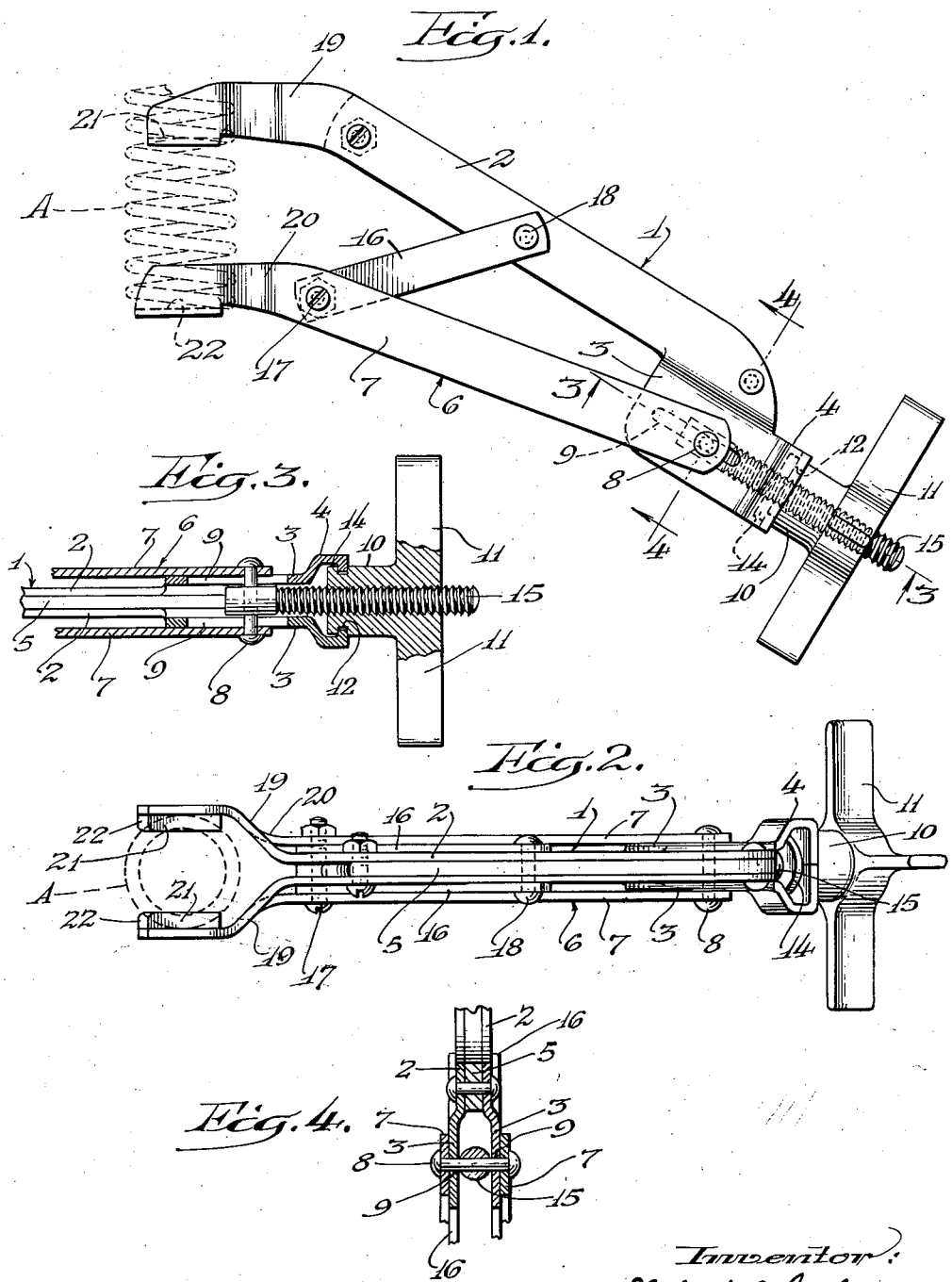

Patented Apr. 13, 1943

2,316,646

UNITED STATES PATENT OFFICE 2,316,646

VALVE LIFTER AND SPRING COMPRESSOR

Herbert A. Berkman, Chicago, Ill., assignor to Zim Manufacturing Company, a corporation of Illinois Application May 25, 1942, Serial No. 444,367

3 Claims. (Cl. 29—86.3)

There are various tools of the so-called valve lifter type adapted to be inserted under a spring surrounding a motor valve stem to force the lower end of the spring up. There are also other tools for compressing such valve springs to lengths that will permit them to be easily placed in position.

The object of the present invention is to produce a simple and novel tool of rugged construction, and easy to operate, in which are combined the functions of the two different tools just mentioned.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side view of a tool embodying the present invention, shown in operative relation to a spring which it is compressing, Fig. 2 is a top plan view of the tool as it appears in Fig. 1; Fig. 3 is a section on line 3—3 of Fig. 1; and Fig. 4 is a section on line 4—4 of Fig. 1.

The tool contains two long sturdy arms connected together at corresponding ends for relative swinging and sliding movements and having at their opposite ends similar jaws for receiving the spring. One of the arms 1, to which I shall refer as the upper arm, may be composed of two flat bars 2 parallel with and spaced apart from each other, the rear ends of the bars being widened in the downward direction, as indicated at 3, and terminating in a loop 4 extending rearwardly from and connecting the parts 3. Any suitable spacing means, shown as a bar 5, may be inserted between the main portions of the bars 2.

The lower arm 6 is also composed of two bars 7, standing on edge and spaced far enough apart to receive between the rear ends thereof the downward extensions on the upper arm. As best shown in Fig. 3, the parts 3 are spaced apart farther than are the main portions of the bars 2, so as to provide a clearance between the main portions of the bars 2 and 7. The rear ends of the two arms are connected together by a rivet 8 passing through the bars 7 and through elongated slots 9 formed in the parts 3, thereby producing a connection that affords relative sliding and swinging movements between the two arms.

Interlocked with the rear end wall of the loop 4, so as to be rotatable therein and be held against lengthwise movement with respect thereto, is a round nut 10 which forms a hub projecting from a hand wheel 11. In the arrangement shown, the hub 10 has a peripheral groove 12 near its free end to provide a short neck porting fitting rotatably in a hole 14 in the rear end of the loop element. Extending through the nut 10 is a screwthreaded stem 15 anchored at its forward end to the rivet 8; this being conveniently accomplished by having the rivet pass through the stem as well as through the arm elements.

The two arms are connected together toward their free or front ends by a pair of links 16 both of which are secured to the corresponding bars of the lower arm by a suitable fastening 17, and which extends upwardly and rearwardly to the arm 1 to which there are secured by a suitable fastening 18 which may conveniently be a rivet. It will be seen that the links 16 form with the two arms a Z. Therefore when the lower arm is pulled back through a turning of the hand wheel in the proper direction, the links 16 are drawn into positions more nearly at right angles to the arms than they are in the positions of the parts illustrated in Fig. 1. This swinging movement of the links can take place only along with a swinging spreading movement of the arms. On the other hand, upon reversing the direction in which the hand wheel is turned, the lower arm is pushed forwardly or toward the left relatively to the upper arm and, therefore, the links tend to swing more into parallelism with the arms; the free ends of the arms being thereby caused to approach each other and permitting the tool to compress a spring which has been inserted in the same.

The two jaws 19 and 20, at the front ends of the arms 1 and 6, respectively, are disposed one directly above the other. The jaws are preferably alike, each having inturned flanges or lips, one on each side, along its lower edge; the flanges on the upper jaw being indicated at 20 and those on the lower jaw at 21. The purpose of the flanges in the lower jaw is to form a seat upon which may rest the lower end of a spring, such as indicated at A, in dotted lines, in Fig. 1 or a washer underlying a spring; while the flanges or lips in the upper jaw have the same function, as well as that of entering between the coils of a spring, as shown in Fig. 1, to compress it to a length that permits it to be readily inserted in its position of final use.

When the tool is used as a so-called valve lifter, the lower jaw is engaged with a stationary part adjacent to the valve stem, while the upper jaw is slipped underneath the spring surrounding the valve stem, or the washer underlying the spring. Then, by turning the hand wheel in the direction to spread the jaws apart, the lower end of the spring is forced up and the spring is compressed so as to relieve the valve stem of the pressure of the spring thereon. When the spring is again to be returned to its place, after having been removed, the tool is adjusted so that when the spring rests on the flanges of the lower jaw as in Fig. 1, the flanges in the upper jaw register with the space between two of the upper coils and may be inserted between such coils. Then, by turning the hand wheel in the opposite direction from that in which it was turned to perform the lifting operation, the jaws are drawn toward each other and thus compress that portion of the spring lying between them. When the spring has been sufficiently compressed it is placed and held in the proper position by the tool. Then, upon turning the hand wheel backward, the jaws are caused to spread and permit the spring to expand to what is its normal length while in use; and, finally, the tool is drawn laterally to disengage the jaws from the spring.

The combined sliding and rocking movement which the arms have relatively to each other serves to keep the flanges or lips in the two jaws substantially parallel with each other within the limits of the opening and closing movements of the tool. For this reason the pressure of the spring on the lips or flanges is always approximately at right angles to the planes of the latter, so that there is no tendency to force the spring laterally out of the tool or out of engagement therewith when the tool applies pressure to the spring.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A tool of the character described, comprising two arms having at corresponding ends a pin and slot connection for limited relative swinging and bodily lengthwise movements, jaws at the other ends of said arms, means interposed between said arms to cause the jaws to move from and toward each other as the arms move relatively to each other back and forth in the lengthwise direction, a nut rotatable in and held against lengthwise movement relative to the slotted arm at the end containing the slot, and a screw-threaded stem anchored at one end to said pin and extending at its other end into the nut.

2. In a tool of the character described, a long arm having at one end an end wall and a hollow interior in front of said wall, said arm having longitudinal slots in opposite sides in the hollow portion thereof, a nut rotatable in but held against lengthwise movement relative to said end wall, a second long arm embracing the first arm at the aforesaid end, a pin extending through the second arm and through said slots, a screw-threaded stem anchored at one end to said pin and entered in the nut at the other end, a hand-hold on said nut for turning the same, jaws at free ends of said arms, and a link hinged to both arms and forming with the adjacent portions thereof a Z.

3. A tool of the character described, comprising two arms connected together at corresponding ends for limited relative swinging and bodily lengthwise movements, U-shaped jaws of light flat metal bar material arranged on edge at the other ends of said arms, inturned flanges at the lower edges of the side members of the jaws to provide each jaw with a seat similar to and facing in the same direction as the seat in the other jaw, means interposed between said arms toward the latter ends thereof to cause the jaws to move from and toward each other as the arms move relatively to each other back and forth in the lengthwise direction, and a device to effect such bodily movements and hold the arms against relative lengthwise movements in either direction in any relative positions which they are caused to assume.

HERBERT A. BERKMAN.